(12) United States Patent
Toiyama

(10) Patent No.: US 10,304,456 B2
(45) Date of Patent: May 28, 2019

(54) VOICE COMMAND INPUT DEVICE AND VOICE COMMAND INPUT METHOD

(71) Applicant: Panasonic Intellectual Property Management Co., Ltd., Osaka (JP)

(72) Inventor: Keiichi Toiyama, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/055,821

(22) Filed: Aug. 6, 2018

(65) Prior Publication Data

US 2018/0350367 A1  Dec. 6, 2018

Related U.S. Application Data

(63) Continuation of application No. 15/122,429, filed as application No. PCT/JP2015/001721 on Mar. 26, 2015, now Pat. No. 10,074,367.

(30) Foreign Application Priority Data

Mar. 28, 2014 (JP) .................................. 2014-068192

(51) Int. Cl.
*G10L 15/00* (2013.01)
*G10L 15/22* (2006.01)
(Continued)

(52) U.S. Cl.
CPC .............. *G10L 15/22* (2013.01); *G10L 15/32* (2013.01); *G10L 17/02* (2013.01); *G10L 17/06* (2013.01); *G10L 2015/223* (2013.01)

(58) Field of Classification Search
CPC ......... G10L 15/22; G10L 17/06; G10L 15/32; G10L 17/02; G10L 2015/223
(Continued)

(56) References Cited

U.S. PATENT DOCUMENTS

| 2003/0093281 A1* | 5/2003 | Geilhufe ................. G10L 13/00 704/275 |
| 2003/0185358 A1 | 10/2003 | Sakamoto |
| 2014/0012587 A1 | 1/2014 | Park |

FOREIGN PATENT DOCUMENTS

| JP | H08-036480 A | 2/1996 |
| JP | 2000-310999 A | 11/2000 |

(Continued)

OTHER PUBLICATIONS

U.S. Notice of Allowance dated May 9, 2018 issued in U.S. Appl. No. 15/122,429.

(Continued)

*Primary Examiner* — Thierry L Pham
(74) *Attorney, Agent, or Firm* — McDermott Will & Emery LLP

(57) ABSTRACT

A voice command input device includes a first voice input unit, a second voice input unit, and a voice command identifier. The first voice input unit converts a voice into first voice command information, and outputs first identification information and the first voice command information. The second voice input unit converts a voice into second voice command information, and outputs second identification information and the second voice command information. The voice command identifier refers to the first identification information and the second identification information, and generates a control signal for controlling an operation target appliance based on the result of referring, the first voice command information, and the second voice command information.

6 Claims, 6 Drawing Sheets

(51) Int. Cl.
  *G10L 15/32* (2013.01)
  *G10L 17/02* (2013.01)
  *G10L 17/06* (2013.01)
  *G10L 17/00* (2013.01)

(58) Field of Classification Search
  USPC .................. 704/231, 246, 251, 270, 275
  See application file for complete search history.

(56) References Cited

FOREIGN PATENT DOCUMENTS

| | | |
|---|---|---|
| JP | 2003-289587 A | 10/2003 |
| JP | 2005-151471 A | 6/2005 |

OTHER PUBLICATIONS

U.S. Non-Final Office Action dated Jan. 16, 2018 issued in U.S. Appl. No. 15/122,429.
U.S. Non-Final Office Action dated Jun. 22, 2017 issued in U.S. Appl. No. 15/122,429.
International Search Report of PCT Application No. PCT/JP2015/01721 dated May 19, 2015 (with English translation).

\* cited by examiner

VOICE COMMAND INPUT DEVICE AND VOICE COMMAND INPUT METHOD

RELATED APPLICATIONS

This application is a continuation patent application of U.S. patent application Ser. No. 15/122,429 filed on Aug. 30, 2016, which is a National Phase of International Patent Application No. PCT/JP2015/001721, filed on Mar. 26, 2015, which in turn claims the benefit of Japanese Patent Application No. 2014-068192, filed on Mar. 28, 2014, the disclosure of which applications are incorporated by reference herein.

TECHNICAL FIELD

The present disclosure relates to a voice command input device and a voice command input method which allow a plurality of users to operate an appliance by voice.

BACKGROUND ART

PTL 1 discloses a voice command input device including a plurality of voice input units. When a plurality of voices are input, the voice command input device prioritizes the plurality of voices, and recognizes one voice with the highest priority.

FIG. 6 is a block diagram showing a configuration of the voice command input device disclosed in PTL 1.

The voice command input device includes a plurality of microphones 601 which are voice input units. Controller 602 recognizes control content specified by voice, and controls the operation of a connected appliance based on the recognized control content. FIG. 6 shows an example where controller 602 performs switching between on and off of power of air conditioner 610, or switching between on and off of power switch 612 of lighting equipment 611.

Microphone 601 is installed in each room of a house, and is connected by a signal wire to one controller 602 installed in the house. In the case where a speaker instructs by voice that switching between on and off of power of air conditioner 610 is to be performed, controller 602 transmits, from interface 607 to remote control 608 of air conditioner 610, based on the result of voice recognition, a control signal instructing that switching between on and off of power is to be performed. Then, the power of air conditioner 610 is turned on or off via remote control 608.

In the case where a speaker instructs by voice that switching between on and off of power of lighting equipment 611 is to be performed, controller 602 transmits, from interface 607 to signal conversion circuit 609, a control signal (digital signal) instructing that switching between on and off of power is to be performed. Signal conversion circuit 609 converts the received control signal into an analog signal and transfers the analog signal to lighting equipment 611, and power switch 612 of lighting equipment 611 is turned on or off.

Controller 602 is configured in the following manner. Controller 602 includes analog/digital conversion circuit (hereinafter referred to as "A/D circuit") 603, arbitration circuit 605, processor 606 for voice recognition, and interface 607.

A/D circuit 603 converts an analog voice signal that is input from microphone 601 into a digital voice signal. Controller 602 is provided with the same number of A/D circuits 603 as the number of microphones 601 installed in the house.

Arbitration circuit 605 accepts only the earliest received voice signal among voice signals input from the plurality of A/D circuits 603. That is, arbitration circuit 605 detects microphone 601 to which voice is input earliest, and connects signal line 604 of this microphone 601 to processor 606 for voice recognition. For example, arbitration circuit 605 can detect the earliest input voice signal by comparing the rise of pulses of the voice signals.

In this manner, only the voice that is uttered earliest by a speaker is recognized by processor 606 for voice recognition. Signals of voices that are uttered later by other speakers reach only arbitration circuit 605, and are not recognized at processor 606 for voice recognition.

As described above, with the voice command input device disclosed in PTL 1, only the voice that is uttered earliest is recognized by processor 606 for voice recognition, and voices that are uttered later are not recognized.

However, sometimes it is not desirable that a voice is not recognized just because it was uttered later. For example, in a case where one voice command input device is used by a plurality of users, voices of the plurality of users picked up by a plurality of microphones are desirably each recognized and processed without prioritization.

CITATION LIST

Patent Literature

PTL 1: Unexamined Japanese Patent Publication No. 2000-310999

SUMMARY

The present disclosure provides a voice command input device which is capable of appropriately performing processing even when voices are simultaneously uttered by a plurality of users, or voice of one speaker is redundantly picked up by a plurality of microphones.

The voice command input device according to the present disclosure includes a first voice input unit, a second voice input unit, and a voice command identifier. The first voice input unit includes a first identification information generator for outputting first identification information, and a first voice recognizer for converting a voice into first voice command information, the first voice input unit being configured to output first voice information including the first identification information and the first voice command information. The second voice input unit includes a second identification information generator for outputting second identification information, and a second voice recognizer for converting a voice into second voice command information, the second voice input unit being configured to output second voice information including the second identification information and the second voice command information. The voice command identifier is configured to generate and output a control signal for controlling an operation target appliance, based on the first voice information and the second voice information. The voice command identifier generates the control signal by referring to the first identification information and the second identification information.

A voice command input method according to the present disclosure includes generating first identification information, converting a voice into first voice command information, generating second identification information, converting a voice into second voice command information, referring to the first identification information and the second identification information, and generating a control signal for controlling an operation target appliance, based on a result of the referring, and the first voice command information and the second voice command information.

DESCRIPTION OF EMBODIMENTS

Hereinafter, exemplary embodiments will be described in detail with reference to the drawings as appropriate. However, unnecessarily detailed description may be omitted. For example, detailed description of already well-known matters and repeated description of substantially the same structure may be omitted. Such omissions are intended to facilitate understanding by those skilled in the art by preventing the following description from becoming unnecessarily redundant.

The appended drawings and the following description are provided for those skilled in the art to fully understand the present disclosure, and the subject described in the claims is not intended to be limited by the appended drawings and the following description.

In the exemplary embodiments described below, cases are described where a voice command input device includes two voice input units, namely, a "first voice input unit" and a "second voice input unit". However, the voice command input device should not be limited to such a configuration. The voice command input device may include three or more voice input units.

In the following exemplary embodiments, a person using the voice command input device is referred to as a "user" or a "speaker". A speaker is a person who utters a voice command to the voice command input device.

In the following exemplary embodiments, a voice uttered by a user to instruct the voice command input device to operate an appliance is referred to as a "voice command".

First Exemplary Embodiment

In the following, a first exemplary embodiment will be described with reference to FIGS. 1 and 2.

(1-1. Configuration)

Figure 1:
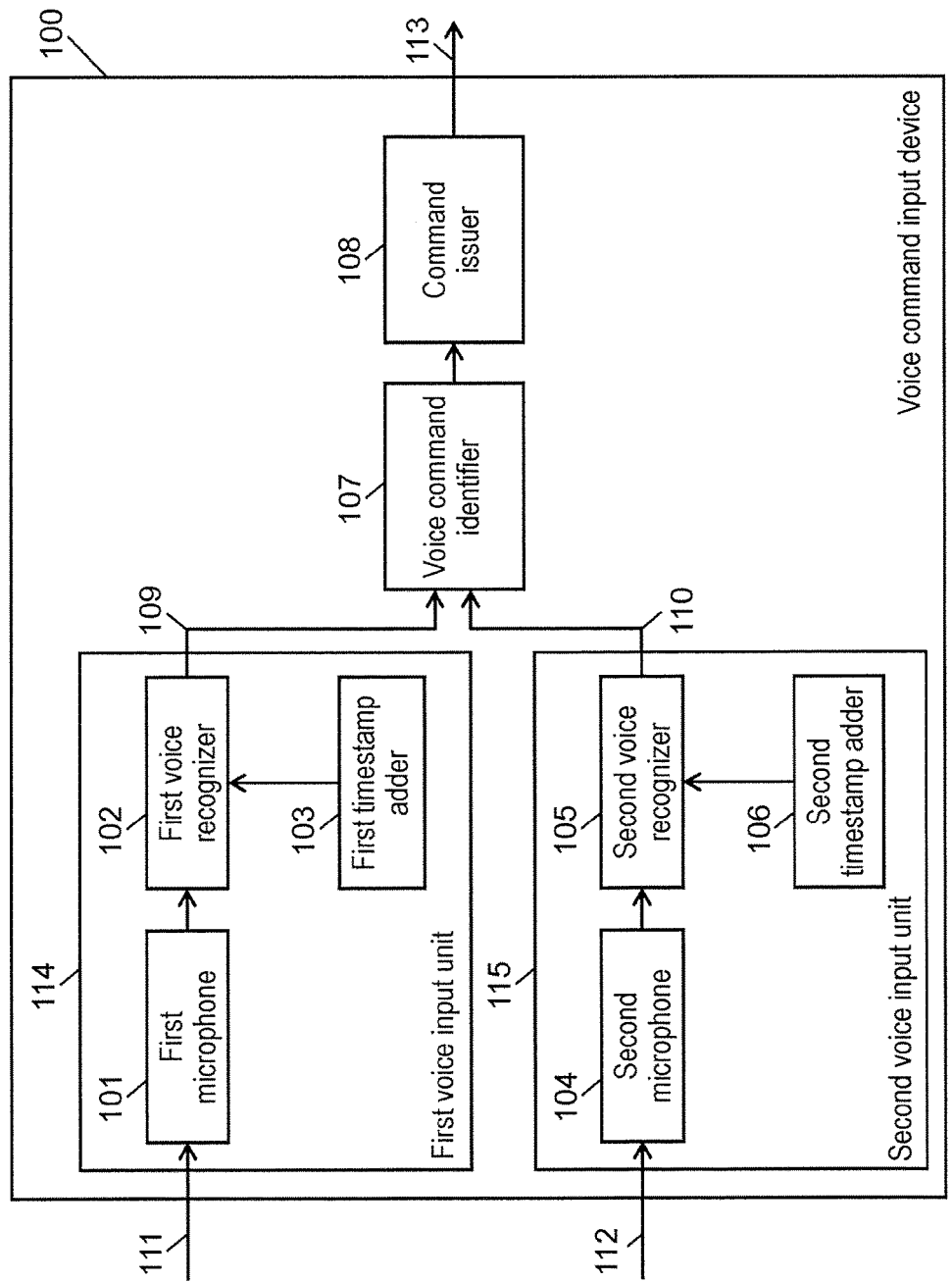
FIG. 1 is a block diagram showing an example of configuration of a voice command input device according to a first exemplary embodiment.

FIG. 1 is a block diagram showing an example of configuration of voice command input device 100 according to the first exemplary embodiment.

Voice command input device 100 includes first voice input unit 114, second voice input unit 115, voice command identifier 107, and command issuer 108.

First voice input unit 114 includes first microphone 101, first voice recognizer 102, and first timestamp adder 103.

Second voice input unit 115 includes second microphone 104, second voice recognizer 105, and second timestamp adder 106.

A voice of a user picked up by first microphone 101 is input to first voice recognizer 102, and is subjected to a voice recognition process. In the present exemplary embodiment, a voice picked up by first microphone 101 is taken as voice command 111. First voice recognizer 102 recognizes voice command 111, and converts the command into first voice command information.

First timestamp adder 103 outputs first timestamp information indicating the time when voice command 111 is input to first voice input unit 114. First timestamp adder 103 is an example of a first identification information generator, and the first timestamp information is an example of first identification information.

Then, first voice recognizer 102 outputs, to voice command identifier 107, first voice information 109 including the first voice command information and the first timestamp information.

A voice of a user picked up by second microphone 104 is input to second voice recognizer 105, and is subjected to a voice recognition process. In the present exemplary embodiment, a voice picked up by second microphone 104 is taken as voice command 112. Second voice recognizer 105 recognizes voice command 112, and converts the command into second voice command information.

Second timestamp adder 106 outputs second timestamp information indicating the time when voice command 112 is input to second voice input unit 115. Second timestamp adder 106 is an example of a second identification information generator, and the second timestamp information is an example of second identification information.

Then, second voice recognizer 105 outputs, to voice command identifier 107, second voice information 110 including the second voice command information and the second timestamp information.

As the voice recognition process to be performed by first voice recognizer 102 and second voice recognizer 105 may be implemented by a generally used voice recognition technique, detailed description thereof is omitted. First timestamp adder 103 and second timestamp adder 106 desirably generate the first timestamp information and the second timestamp information by referring to the same time managed by voice command input device 100. However, information other than time may alternatively be referred to as long as it is possible to indicate the timing of an input of a voice to the voice input unit. For example, time information that is counted up or down with lapse of a specific period of time may be referred to instead of the time.

Voice command identifier 107 generates a control signal according to an appliance which is the operation target of voice command input device 100 (hereinafter such an appliance will be referred to as an "operation target appliance") based on first voice information 109 output from first voice input unit 114 and second voice information 110 output from second voice input unit 115, and outputs the control signal to command issuer 108.

Command issuer 108 converts the control signal output from voice command identifier 107 into appliance control signal 113 for controlling the operation target appliance of voice command input device 100, and outputs appliance control signal 113.

Command issuer 108 is assumed to be configured as appropriate according to the operation target appliance of voice command input device 100. For example, in the case where the operation target appliance is a television set (hereinafter referred to as a "TV") provided with an infrared remote control signal receiver, it is assumed that command issuer 108 is an infrared remote control code output device. In this case, the control signal that is output from voice command identifier 107 is a remote control code for controlling the TV. Command issuer 108 converts the control signal output from voice command identifier 107 into an infrared remote control code, and outputs the code. Accordingly, appliance control signal 113 is the infrared remote control code.

As described above, in the present exemplary embodiment, command issuer 108 is not limited to a specific configuration, and it is assumed that command issuer 108 is configured as appropriate according to the operation target appliance of voice command input device 100. In the case where there are a plurality of operation target appliances of voice command input device 100, it is assumed that a plurality of configurations according to the plurality of operation target appliances are included. Voice command identifier 107 is configured to output control signals as appropriate according to the configuration of command issuer 108.

According to voice command input device 100 configured in the above manner, each of a plurality of voice input units can simultaneously accept voice commands uttered by different users. Accordingly, even if a plurality of users simultaneously utter voice commands to respective microphones, voice command input device 100 can recognize each of the plurality of voice commands, and perform a plurality of processes based on the results of voice recognition.

With a voice command input device with such a configuration, if one voice command uttered by one speaker is redundantly picked up by a plurality of microphones installed in a relatively small region for example, the one voice command may erroneously be recognized as a plurality of voice commands, and processes may be redundantly performed.

However, voice command input device 100 described in the present exemplary embodiment is capable of distinguishing whether voice commands picked up by respective microphones have been uttered by one speaker or by a plurality of speakers, and of performing process(es) as appropriate.

Next, the operation will be described with reference to FIG. 2.

(1-2. Operation)

Figure 2:
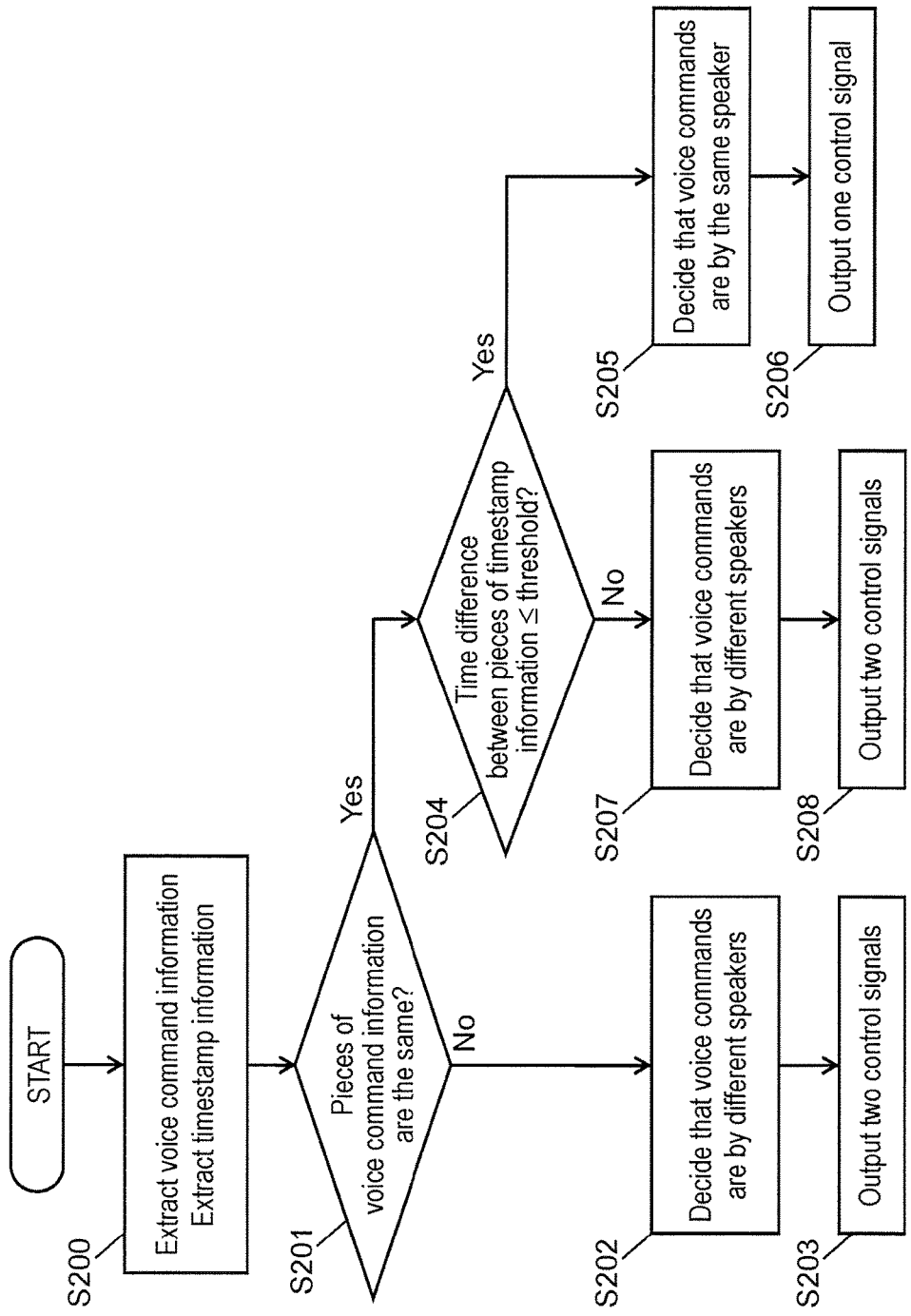
FIG. 2 is a flow chart showing an example of operation of the voice command input device according to the first exemplary embodiment.

FIG. 2 is a flow chart showing an example of operation of voice command input device 100 according to the first exemplary embodiment.

In the present exemplary embodiment, an example operation is described for a case where two pieces of voice information (for example, first voice information 109 and second voice information 110) are approximately simultaneously input to voice command identifier 107, or where the period during which one piece of voice information is input and the period during which the other piece of voice information is input overlap each other. Description of an operation is not provided for when only one piece of voice information is input and voice command identifier 107 generates a control signal according to the voice command information included in the voice information and outputs the control signal. Voice command input device 100 may include three or more voice input units, and three or more pieces of voice information may be input to voice command identifier 107.

Voice command identifier 107 extracts voice command information (for example, first voice command information and second voice command information) and timestamp information (for example, first timestamp information and second timestamp information) from each of two pieces of voice information (for example, first voice information 109 and second voice information 110) (step S200).

Next, voice command identifier 107 compares the two pieces of voice command information extracted in step S200 with each other, and decides whether the two are substantially the same or not (step S201).

When it is decided in step S201 that respective pieces of voice command information are not the same with each other (No), voice command identifier 107 determines that respective pieces of voice command information extracted in step S200 are separate pieces of information based on voices uttered by different speakers (step S202).

Accordingly, voice command identifier 107 generates control signals (for example, two control signals) corresponding to respective pieces of voice command information extracted in step S200, and outputs the control signals to command issuer 108 (step S203).

When it is decided in step S201 that respective pieces of voice command information are the same with each other (Yes), voice command identifier 107 calculates the time difference between the two pieces of timestamp information extracted in step S200. Then, the calculated time difference and a recognition threshold value set in advance are compared with each other (step S204).

The recognition threshold value is assumed to be set to one second, for example, but is not limited to such a numerical value, and may be set to a numerical value other than one second. The recognition threshold value may be held in advance in voice command identifier 107, or the recognition threshold value may be acquired or set from outside.

When it is decided in step S204 that the time difference between the two pieces of timestamp information is at or below the recognition threshold value (Yes), voice command identifier 107 determines that respective pieces of voice command information extracted in step S200 are the same information based on the voice uttered by one speaker (step S205).

Accordingly, voice command identifier 107 generates one control signal corresponding to the voice command information, and outputs the control signal to command issuer 108 (step S206).

When it is decided in step S204 that the time difference between the two pieces of timestamp information is greater than the recognition threshold value (No), voice command identifier 107 determines that respective pieces of voice command information extracted in step S200 are separate pieces of information based on voices uttered by different speakers (step S207). That is, voice command identifier 107 determines that the two pieces of voice command information have the same content but are to be processed as separate voice commands of different speakers.

Accordingly, voice command identifier 107 generates control signals (for example, two control signals) corresponding to respective pieces of voice command information extracted in step S200, and outputs the control signals to command issuer 108 (step S208).

(1-3. Effect and Others)

As described above, in the present exemplary embodiment, the voice command input device includes a first voice input unit, a second voice input unit, and a voice command identifier. The first voice input unit includes a first identification information generator for outputting first identification information, and a first voice recognizer for converting a voice into first voice command information, the first voice input unit being configured to output first voice information including the first identification information and the first voice command information. The second voice input unit includes a second identification information generator for outputting second identification information, and a second voice recognizer for converting a voice into second voice command information, the second voice input unit being configured to output second voice information including the second identification information and the second voice command information. The voice command identifier is configured to generate and output a control signal for controlling an operation target appliance, based on the first voice information and the second voice information. The voice command identifier generates the control signal by referring to the first identification information and the second identification information.

In the present exemplary embodiment, the first identification information generator outputs, as the first identification information, first timestamp information indicating a timing of an input of a voice to the first voice input unit, and the second identification information generator outputs, as the second identification information, second timestamp information indicating a timing of an input of a voice to the second voice input unit. The voice command identifier generates the control signal based on a time difference between the first timestamp information and the second timestamp information.

First voice input unit 114 is an example of the first voice input unit, first voice recognizer 102 is an example of the first voice recognizer, first timestamp adder 103 is an example of the first identification information generator, second voice input unit 115 is an example of the second voice input unit, second voice recognizer 105 is an example of the second voice recognizer, second timestamp adder 106 is an example of the second identification information generator, voice command identifier 107 is an example of the voice command identifier, first voice information 109 is an example of the first voice information, and second voice information 110 is an example of the second voice information.

Thus, according to voice command input device 100, each of a plurality of voice input units can simultaneously accept voice commands uttered by different users. Accordingly, even when a plurality of users simultaneously utter voice commands to respective microphones, voice command input device 100 can perform voice recognition of each of these voice commands, and can perform a plurality of processes based on the results of voice recognition.

Voice command input device 100 can distinguish, based on the timestamp information, whether voice commands picked up by respective microphones have been uttered by one speaker or by a plurality of speakers, and can generate control signal(s) based on a result of the distinction. Accordingly, even if one voice command uttered by one speaker is redundantly picked up by a plurality of microphones installed in a relatively small region for example, an erroneous operation of redundantly performing processes, for example, can be reduced, and a process based on the voice command can be appropriately performed.

In the present exemplary embodiment, an example is described where the recognition threshold value is one second, but the recognition threshold value may be shorter than one second or longer than one second. For example, in the case where the recognition threshold value is set to a relatively long time, if a user has a habit of repeating the same word when uttering a voice command, the interval between uttered voice commands is highly likely to be within the recognition threshold value, and thus the possibility of the repeated voice commands being decided as one voice command can be increased, and erroneous operation can be suppressed.

For example, it is assumed that a user has unintentionally repeatedly uttered a command for turning off the power of a TV by saying "off, off". In such a case, if the recognition threshold value is set to a relatively short time, the voice command identifier may possibly erroneously recognize the two voices as separate voice commands. If such erroneous recognition occurs, there may be caused an erroneous operation where a control signal for switching between on and off of the power of the TV is output twice from the voice command identifier to the command issuer, and appliance control signal 113 for switching between on and off of the power of the TV is issued twice by the command issuer which has received the control signals, and as a result, the power of the TV is turned off once and is turned on again. However, by setting the recognition threshold value to a relatively long time, such unintentional erroneous operation can be prevented.

On the other hand, if the recognition threshold value is set to a relatively short time, even when a plurality of users have approximately simultaneously uttered the same voice command to separate microphones, these voice commands can be recognized as separate voice commands, and the possibility of processes being correctly performed can be increased.

The time information to be referred to by first timestamp adder 103 and the time information to be referred to by second timestamp adder 106 may be the same time information or different pieces of time information. However, in the case where the pieces of time information are different, the pieces of time information are desirably synchronous with each other. For example, first timestamp adder 103 and second timestamp adder 106 may communicate with each other on a regular basis so as to synchronize respective pieces of time information. The voice command input device may be configured such that communication with the same time information source (clock source; for example, a time distribution device such as an NTP server (Network Time Protocol Server), or the like) is performed on a regular basis, and such that the time information is synchronized with the time information source.

As described above, if the recognition threshold value is set to a relatively short time, an erroneous operation may be performed in the case where the user has a habit of repeating the same word at the time of uttering a voice command, and the following measure may be taken to reduce such erroneous operation. For example, voice command identifier 107 sets a same input threshold as second threshold information. Even if the time difference between two pieces of timestamp information is above a recognition threshold value which is first threshold information, if the time difference is at or below the same input threshold, which is the second threshold information, two pieces of voice command information are treated as one piece of voice command information. Accordingly, it is possible to appropriately cope with both a case where voice commands are uttered approximately simultaneously by a plurality of users and a case where a user has a habit of repeating the same word when uttering a voice command.

First voice input unit 114 and second voice input unit 115 provided to voice command input device 100 may be installed at separate locations. Alternatively, only first microphone 101 and second microphone 104 may be installed at separate locations, and other blocks may be embedded in one device.

Second Exemplary Embodiment

In the first exemplary embodiment, an example is described where first timestamp adder 103 is provided as the first identification information generator, where the first timestamp information is used as the first identification information, where second timestamp adder 106 is provided as the second identification information generator, and where the second timestamp information is used as the second identification information.

In the present exemplary embodiment, an example will be described where a position information adder is provided as the identification information generator, and where position information is used as identification information.

In the following, a second exemplary embodiment will be described with reference to FIG. 3.

(2-1. Configuration)

Figure 3:
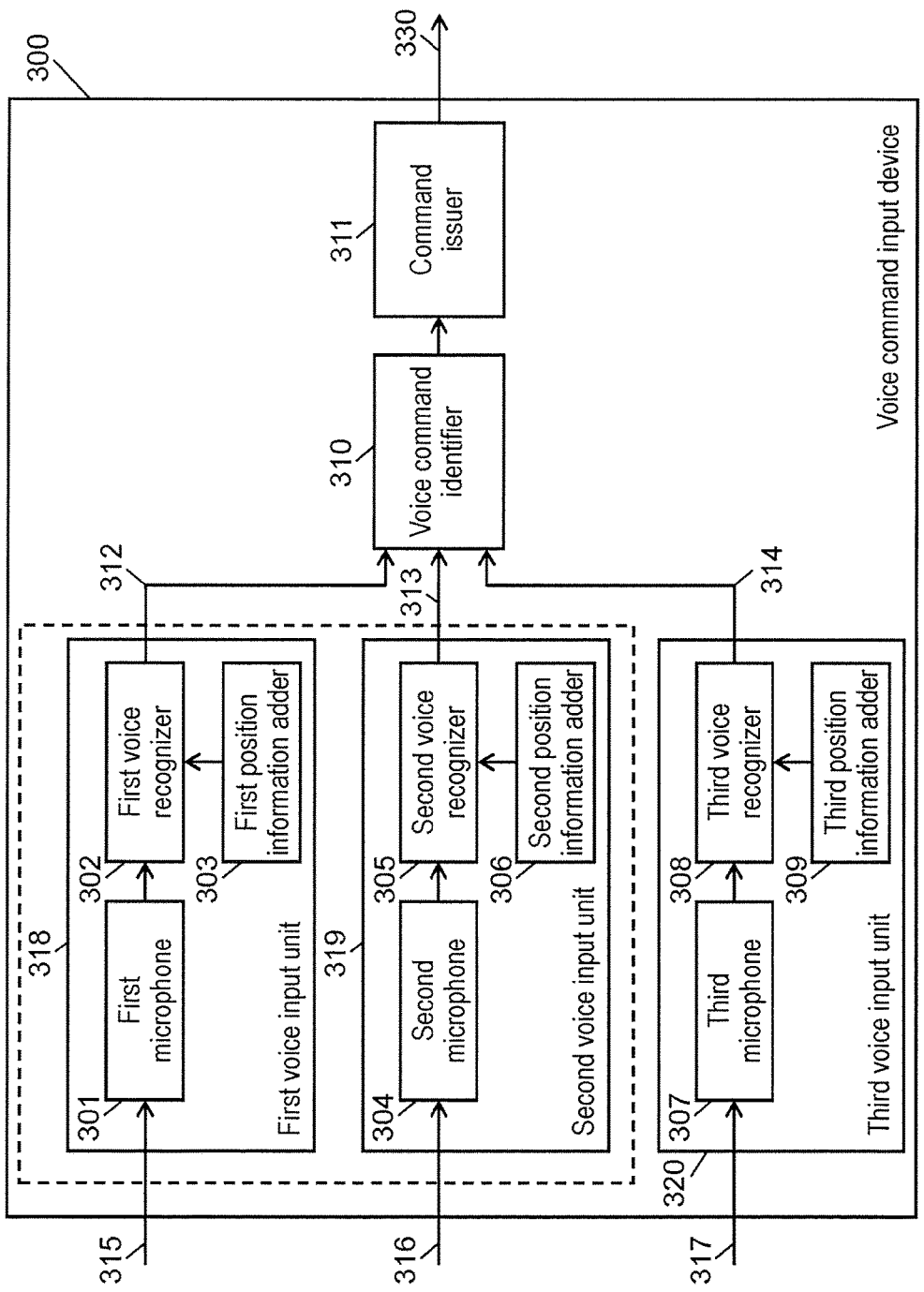
FIG. 3 is a block diagram showing an example of configuration of a voice command input device according to a second exemplary embodiment.

FIG. 3 is a block diagram showing an example of configuration of voice command input device 300 according to the second exemplary embodiment.

Voice command input device 300 includes first voice input unit 318, second voice input unit 319, third voice input unit 320, voice command identifier 310, and command issuer 311.

First voice input unit 318 includes first microphone 301, first voice recognizer 302, and first position information adder 303.

Second voice input unit 319 includes second microphone 304, second voice recognizer 305, and second position information adder 306.

Third voice input unit 320 includes third microphone 307, third voice recognizer 308, and third position information adder 309.

A voice of a user picked up by first microphone 301 is input to first voice recognizer 302, and is subjected to a voice recognition process. In the present exemplary embodiment, a voice picked up by first microphone 301 is taken as voice command 315. First voice recognizer 302 recognizes voice command 315, and converts the command into first voice command information. First position information adder 303 outputs first position information indicating position information of the location where first microphone 301 is installed, for example. First position information adder 303 is an example of the first identification information generator, and the first position information is an example of the first identification information. First voice recognizer 302 outputs first voice information 312 including the first voice command information and the first position information to voice command identifier 310.

A voice of a user picked up by second microphone 304 is input to second voice recognizer 305, and is subjected to a voice recognition process. In the present exemplary embodiment, a voice picked up by second microphone 304 is taken as voice command 316. Second voice recognizer 305 recognizes voice command 316, and converts the command into second voice command information. Second position information adder 306 outputs second position information indicating position information of the location where second microphone 304 is installed, for example. Second position information adder 306 is an example of the second identification information generator, and the second position information is an example of the second identification information. Second voice recognizer 305 outputs second voice information 313 including the second voice command information and the second position information to voice command identifier 310.

A voice of a user picked up by third microphone 307 is input to third voice recognizer 308, and is subjected to a voice recognition process. In the present exemplary embodiment, a voice picked up by third microphone 307 is taken as voice command 317. Third voice recognizer 308 recognizes voice command 317, and converts the command into third voice command information. Third position information adder 309 outputs third position information indicating position information of the location where third microphone 307 is installed, for example. Third position information adder 309 is an example of the second identification information generator, and the third position information is an example of the second identification information. Third voice recognizer 308 outputs third voice information 314 including the third voice command information and the third position information to voice command identifier 310.

The voice recognition process to be performed by each voice recognizer may be implemented by a generally used voice recognition technique, and detailed description thereof is omitted. Each position information adder may be configured to detect the position information by a generally used position information detection technique, or may be configured to hold position information that is registered in advance.

For example, in the present exemplary embodiment, first voice input unit 318 and second voice input unit 319 are assumed to be installed close to each other (for example, in the same room), and the name of the location is given as "location 1". Third voice input unit 320 is assumed to be installed at a location different from location 1 (for example, in a room different from location 1), and it is assumed that the name of the location is given as "location 2".

It is assumed that a voice uttered at location 1 is picked up by one or both of first microphone 301 and second microphone 304, but is not picked up by third microphone 307. It is assumed that a voice uttered at location 2 is picked up by third microphone 307, but is not picked up by first microphone 301 and second microphone 304.

It is assumed that same position information indicating location 1 is held in first position information adder 303 and second position information adder 306, and position information indicating location 2 is held in third position information adder 309.

Voice command identifier 310 generates a control signal according to an appliance which is an operation target of voice command input device 300 (operation target appliance), based on first voice information 312 output from first voice input unit 318, second voice information 313 output from second voice input unit 319, and third voice information 314 output from third voice input unit 320, and outputs the control signal to command issuer 311.

Command issuer 311 converts the control signal output from voice command identifier 310 into appliance control signal 330 for controlling the operation target appliance of voice command input device 300, and outputs appliance control signal 330.

It is assumed that command issuer 311 is configured as appropriate according to the operation target appliance of voice command input device 300. For example, in the case where the operation target appliance is a TV provided with an infrared remote control signal receiver, command issuer 311 is an infrared remote control code output device. In this case, the control signal that is output from voice command identifier 310 is a remote control code for controlling the TV, and command issuer 311 converts the control signal input from voice command identifier 310 into an infrared remote control code, and outputs the infrared remote control code. Accordingly, appliance control signal 330 is the infrared remote control code.

As described above, according to the present exemplary embodiment, command issuer 311 is not limited to a specific configuration, and is configured as appropriate according to the operation target appliance of voice command input device 300. In the case where there are a plurality of operation target appliances of voice command input device 300, it is assumed that a plurality of configurations according to the plurality of operation target appliances are included. And then, voice command identifier 310 is configured to output control signals as appropriate according to the configuration of command issuer 311.

According to voice command input device 300 configured in the above manner, a plurality of voice input units can simultaneously accept voice commands uttered by different users. Accordingly, as with voice command input device 100 described in the first exemplary embodiment, even if a plurality of users simultaneously utter voice commands to respective microphones, voice command input device 300 can recognize each of the plurality of voice commands, and perform a plurality of processes based on the results of voice recognition.

Voice command input device 300 described in the present exemplary embodiment can distinguish, by a method different from that of voice command input device 100 described in the first exemplary embodiment, whether voice commands picked up by respective microphones have been uttered by one speaker or by a plurality of speakers, and can perform process(es) as appropriate.

The operation will be described next.

(2-2. Operation)

In the present exemplary embodiment, an example operation is described for a case where three pieces of voice information (in this example, first voice information 312, second voice information 313, and third voice information 314) are approximately simultaneously input to voice command identifier 310, or where the pieces of information are input within a predetermined period of time (a period of time long enough to cause an input period where the pieces of information overlap one another; for example, five seconds). It is assumed that, when only one piece of voice information is input, voice command identifier 310 generates a control signal according to the voice command information included in the voice information and outputs the control signal. Description of the above operation is omitted. Voice command input device 300 may include two voice input units or four or more voice input units, and two pieces of voice information or four or more pieces of voice information may be input to voice command identifier 310.

When a plurality of pieces of voice information are input within the predetermined period of time, voice command identifier 310 first extracts the position information from each piece of voice information, and compares the pieces of position information with one another. Also, voice command identifier 310 extracts the voice command information from each piece of voice information, and compares the pieces of voice command information with one another.

When, as a result of comparison, it is decided that the pieces of position information are different from one another, voice command identifier 310 determines that respective pieces of voice command information included in the pieces of voice information are separate pieces of information based on voices uttered by different speakers, and generates and outputs control signals according to respective pieces of voice command information.

When, as a result of comparison, it is decided that respective pieces of position information are the same with one another and that respective pieces of voice command information are also the same with one another, voice command identifier 310 determines that the pieces of voice command information included in respective pieces of voice information are the same piece of information based on a voice uttered by one speaker, and generates and outputs a control signal according to the voice command information.

When, as a result of comparison, it is decided that respective pieces of position information are the same with one another but respective pieces of voice command information are different from one another, voice command identifier 310 determines that the pieces of voice command information included in respective pieces of voice information are separate pieces of information based on voices uttered by different speakers, and generates and outputs control signals according to respective pieces of voice command information.

When, as a result of comparison, it is decided that same pieces of position information with one another and different pieces of position information from one another are present in a mixed manner, voice command identifier 310 determines, for the pieces of voice information of the different pieces of position information from one another, that the pieces of voice command information included in the pieces of voice information are separate pieces of information based on voices uttered by different speakers. With respect to the pieces of voice information of the same pieces of position information with one another, if pieces of voice command information included in the pieces of voice information are the same with one another, the pieces of voice command information are determined to be the same piece of information based on a voice uttered by one speaker, and if the pieces of voice command information included in the pieces of voice information are different from each other, the pieces of voice command information are determined to be separate pieces of information based on voices uttered by different speakers. Then, based on the result of determination, control signals according to the pieces of voice command information are generated and output.

For example, it is assumed that first voice information 312 and third voice information 314 are input to voice command identifier 310 within the predetermined period of time. At this time, if the first position information and the third position information are different pieces of position information from each other, voice command identifier 310 determines that the first voice command information and the third voice command information are separate pieces of information based on voices uttered by different speakers. Accordingly, voice command identifier 310 generates a control signal corresponding to the first voice command information and a control signal corresponding to the third voice command information, and outputs the control signals to command issuer 311.

For example, it is assumed that first voice information 312 and second voice information 313 are input to voice command identifier 310 within the predetermined period of time. It is also assumed that the first voice command information and the second voice command information are the same voice command information with each other, and that the first position information and the second position information are the same position information with each other. At this time, voice command identifier 310 determines that the first voice command information and the second voice command information are the same piece of information based on a voice uttered by one speaker. Then, one control signal corresponding to the first voice command information (or the second voice command information) is generated and is output to command issuer 311.

For example, it is assumed that first voice information 312 and second voice information 313 are input to voice command identifier 310 within the predetermined period of time. It is also assumed that the first position information and the second position information are the same position information with each other but the first voice command information and the second voice command information are different pieces of voice command information from each other. At this time, voice command identifier 310 determines that the first voice command information and the second voice command information are separate pieces of information based on voices uttered by different speakers. Accordingly, voice command identifier 310 generates a control signal corresponding to the first voice command information and a control signal corresponding to the second voice command information, and outputs the control signals to command issuer 311.

For example, it is assumed that first voice information 312, second voice information 313, and third voice information 314 are input to voice command identifier 310 within the predetermined period of time. It is also assumed that the first voice command information, the second voice command information, and the third voice command information are the same pieces of voice command information with one another. At this time, if the first position information and the second position information are the same position information with each other, voice command identifier 310 determines that the first voice command information and the second voice command information are the same piece of information based on a voice uttered by one speaker. If the first position information (and the second position information) and the third position information are different pieces of position information from each other, voice command identifier 310 determines that the first voice command information (and the second voice command information) and the third voice command information are separate pieces of information based on voices uttered by different speakers. Accordingly, voice command identifier 310 generates a control signal corresponding to the first voice command information (or the second voice command information) and a control signal corresponding to the third voice command information, and outputs the control signals to command issuer 311.

In this manner, when a plurality of pieces of voice information are input within the predetermined period of time, voice command identifier 310 described in the present exemplary embodiment extracts the position information from each piece of voice information and compares the pieces of position information with one another, and generates control signal(s) based on the result of comparison and the voice command information included in each piece of voice information, and outputs the control signal(s). When only one piece of voice information is input within the predetermined period of time, a control signal corresponding to the voice command information included in the voice information is generated and output.

Decision regarding whether within the predetermined period of time or not can be made by providing a timer to voice command identifier 310 and setting in advance a threshold for deciding the predetermined period of time, and by comparing the time measured by the timer and the threshold, for example. The timer may be configured such that measurement of time is started at the time of input of the earliest voice information and reset is performed at the time of output of a control signal, for example.

(2-3. Effect, etc.)

As described above, in the present exemplary embodiment, the voice command input device includes a first voice input unit, a second voice input unit, and a voice command identifier. The first voice input unit includes a first identification information generator for outputting first identification information, and a first voice recognizer for converting a voice into first voice command information, the first voice input unit being configured to output first voice information including the first identification information and the first voice command information. The second voice input unit includes a second identification information generator for outputting second identification information, and a second voice recognizer for converting a voice into second voice command information, the second voice input unit being configured to output second voice information including the second identification information and the second voice command information. The voice command identifier is configured to generate and output a control signal for controlling an operation target appliance, based on the first voice information and the second voice information. The voice command identifier generates the control signal by referring to the first identification information and the second identification information.

In the present exemplary embodiment, the first identification information generator outputs, as the first identification information, first position information indicating a location where the first voice input unit is installed, and the second identification information generator outputs, as the second identification information, second position information indicating a location where the second voice input unit is installed. The voice command identifier generates the control signal based on a comparison of the first position information and the second position information.

First voice input unit 318 is an example of the first voice input unit, first voice recognizer 302 is an example of the first voice recognizer, first position information adder 303 is an example of the first identification information generator, second voice input unit 319 and third voice input unit 320 are examples of the second voice input unit, second voice recognizer 305 and third voice recognizer 308 are examples of the second voice recognizer, second position information adder 306 and third position information adder 309 are examples of the second identification information generator, voice command identifier 310 is an example of the voice command identifier, first voice information 312 is an example of the first voice information, and second voice information 313 and third voice information 314 are examples of the second voice information.

Thus, according to voice command input device 300, each of a plurality of voice input units can simultaneously accept voice commands uttered by different users. Accordingly, even when a plurality of users simultaneously utter voice commands to respective microphones, voice command input device 300 can perform voice recognition of each of these voice commands, and can perform a plurality of processes based on the results of voice recognition.

Voice command input device 300 can distinguish, based on the position information, whether voice commands picked up by respective microphones have been uttered by one speaker or by a plurality of speakers, and can generate control signal(s) based on a result of the distinction. Accordingly, even if one voice command uttered by one speaker is redundantly picked up by a plurality of microphones installed in a relatively small region for example, an erroneous operation of redundantly performing processes, for example, can be reduced, and a process based on the voice command can be appropriately performed.

The position information may be set in advance, or may be acquired by generally used position information detection means (for example, a device that detects position information by using information of access point of Wi-Fi (Wireless Fidelity), information of beacon, information of GPS (Global Positioning System), etc.). A configuration including such position information detection means is effective in a case where the voice input unit possibly moves with lapse of time as in a case where the microphone is worn by a user or the voice input unit is installed in a mobile body such as a vehicle, for example.

Third Exemplary Embodiment

In the present exemplary embodiment, an example is described where an individual identifier as the identification information generator is provided, and where speaker information is used as the identification information.

In the following, the third exemplary embodiment will be described with reference to FIGS. 4 and 5.

(3-1. Configuration)

Figure 4:
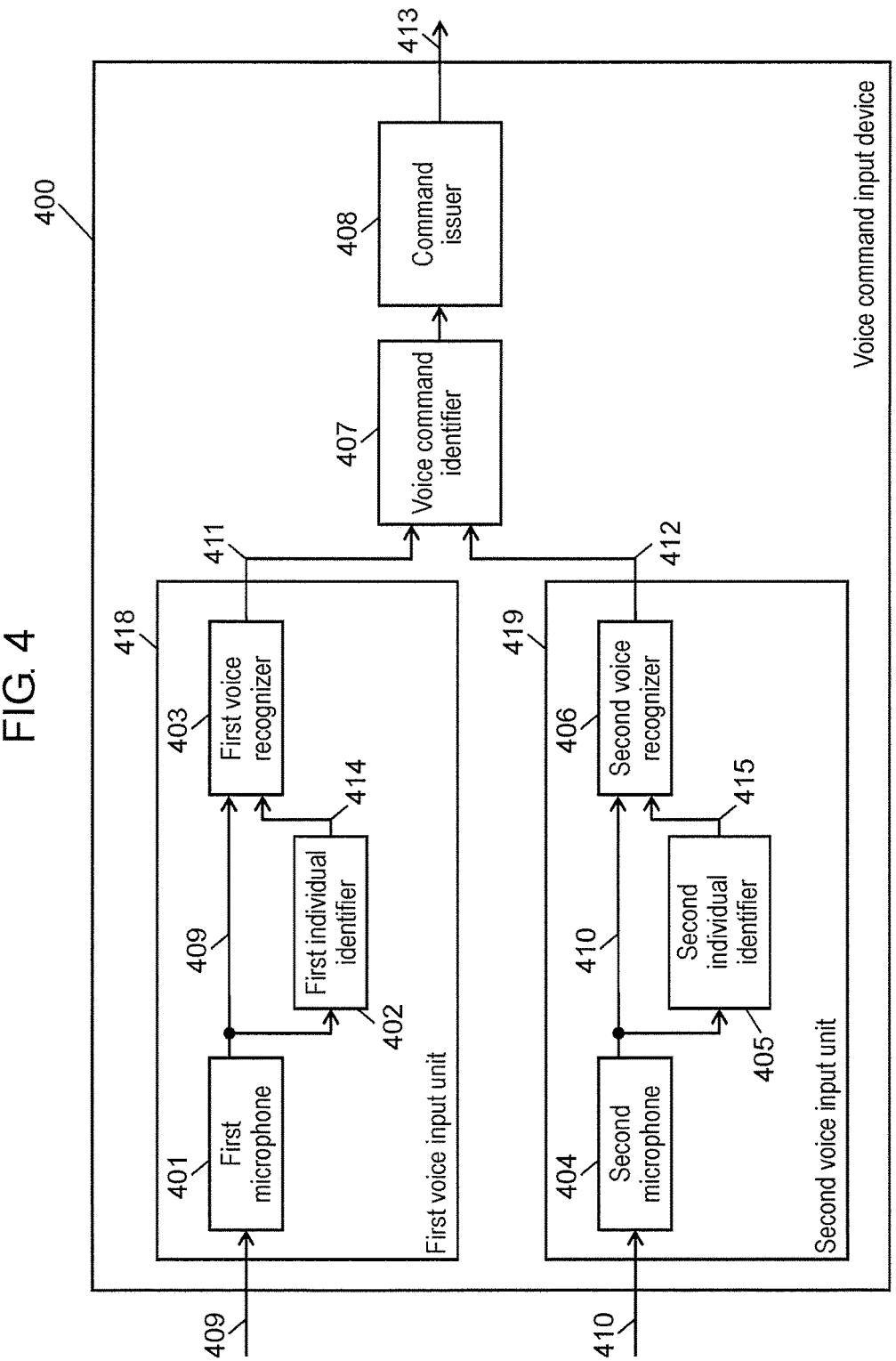
FIG. 4 is a block diagram showing an example of configuration of a voice command input device according to a third exemplary embodiment.

FIG. 4 is a block diagram showing an example of configuration of voice command input device 400 according to the third exemplary embodiment.

Voice command input device 400 includes first voice input unit 418, second voice input unit 419, voice command identifier 407, and command issuer 408.

First voice input unit 418 includes first microphone 401, first individual identifier 402, and first voice recognizer 403.

Second voice input unit 419 includes second microphone 404, second individual identifier 405, and second voice recognizer 406.

A voice of a user picked up by first microphone 401 is input to first voice recognizer 403, and is subjected to a voice recognition process. In the present exemplary embodiment, a voice picked up by first microphone 401 is taken as first voice command 409. First voice command 409 is also input to first individual identifier 402.

First individual identifier 402 analyzes the voice to specify the speaker who has uttered first voice command 409, and specifies the speaker. Then, first speaker information 414 indicating the speaker is output to first voice recognizer 403.

First voice recognizer 403 recognizes first voice command 409 and converts the command into first voice command information. Then, first voice recognizer 403 outputs first voice information 411 including the first voice command information and first speaker information 414 to voice command identifier 407.

A voice of a user picked up by second microphone 404 is input to second voice recognizer 406, and is subjected to a voice recognition process. In the present exemplary embodiment, a voice picked up by second microphone 404 is taken as second voice command 410. Second voice command 410 is also input to second individual identifier 405.

Second individual identifier 405 analyzes the voice to specify the speaker who has uttered second voice command 410, and specifies the speaker. Then, second speaker information 415 indicating the speaker is output to second voice recognizer 406.

Second voice recognizer 406 recognizes second voice command 410 and converts the command into second voice command information. Then, second voice recognizer 406 outputs second voice information 412 including the second voice command information and second speaker information 415 to voice command identifier 407.

As the voice recognition process to be performed by each voice recognizer may be implemented by a generally used voice recognition technique, detailed description thereof is omitted.

As described above, first individual identifier 402 identifies an individual by using first voice command 409, and second individual identifier 405 identifies an individual by using second voice command 410. As identification of an individual by voice may be implemented by a generally used biometric authentication technique (a technique of performing individual authentication by comparing voiceprint information that is registered in advance and voiceprint information that is input, and of specifying an individual), detailed description thereof is omitted.

The first speaker information and the second speaker information are desirably individual ID (Identification), an individual name or the like, but any information may be used as long as an individual can be specified by the information.

Voice command identifier 407 generates a control signal according to an appliance which is an operation target of voice command input device 400 (operation target appliance), based on first voice information 411 output from first voice input unit 418, and second voice information 412 output from second voice input unit 419, and outputs the control signal to command issuer 408.

Command issuer 408 converts the control signal output from voice command identifier 407 into appliance control signal 413 for controlling the operation target appliance of voice command input device 400, and outputs appliance control signal 413.

It is assumed that command issuer 408 is configured as appropriate according to the operation target appliance of voice command input device 400. For example, in the case where the operation target appliance is a TV provided with an infrared remote control signal receiver, command issuer 408 is an infrared remote control code output device. In this case, the control signal that is output from voice command identifier 407 is a remote control code for controlling the TV, and command issuer 408 converts the control signal output from voice command identifier 407 into an infrared remote control code, and outputs the infrared remote control code. Accordingly, appliance control signal 413 is the infrared remote control code.

As described above, according to the present exemplary embodiment, command issuer 408 is not limited to a specific configuration, and is configured as appropriate according to the operation target appliance of voice command input device 400. In the case where there are a plurality of operation target appliances of voice command input device 400, it is assumed that a plurality of configurations according to the plurality of operation target appliances are included. Voice command identifier 407 is configured to output control signals as appropriate according to the configuration of command issuer 408.

According to voice command input device 400 configured in the above manner, a plurality of voice input units can simultaneously accept voice commands uttered by different users. Accordingly, as with voice command input device 100 described in the first exemplary embodiment and voice command input device 300 described in the second exemplary embodiment, even if a plurality of users simultaneously utter voice commands to respective microphones, voice command input device 400 can recognize each of the plurality of voice commands, and perform a plurality of processes based on the results of voice recognition.

Voice command input device 400 described in the present exemplary embodiment can distinguish, by a method different from those of voice command input device 100 described in the first exemplary embodiment and voice command input device 300 described in the second exemplary embodiment, whether voice commands picked up by respective microphones of a plurality of microphones have been uttered by one speaker or by a plurality of speakers, and can perform process(es) as appropriate.

Next, the operation will be described with reference to FIG. 5.

(3-2. Operation)

Figure 5:
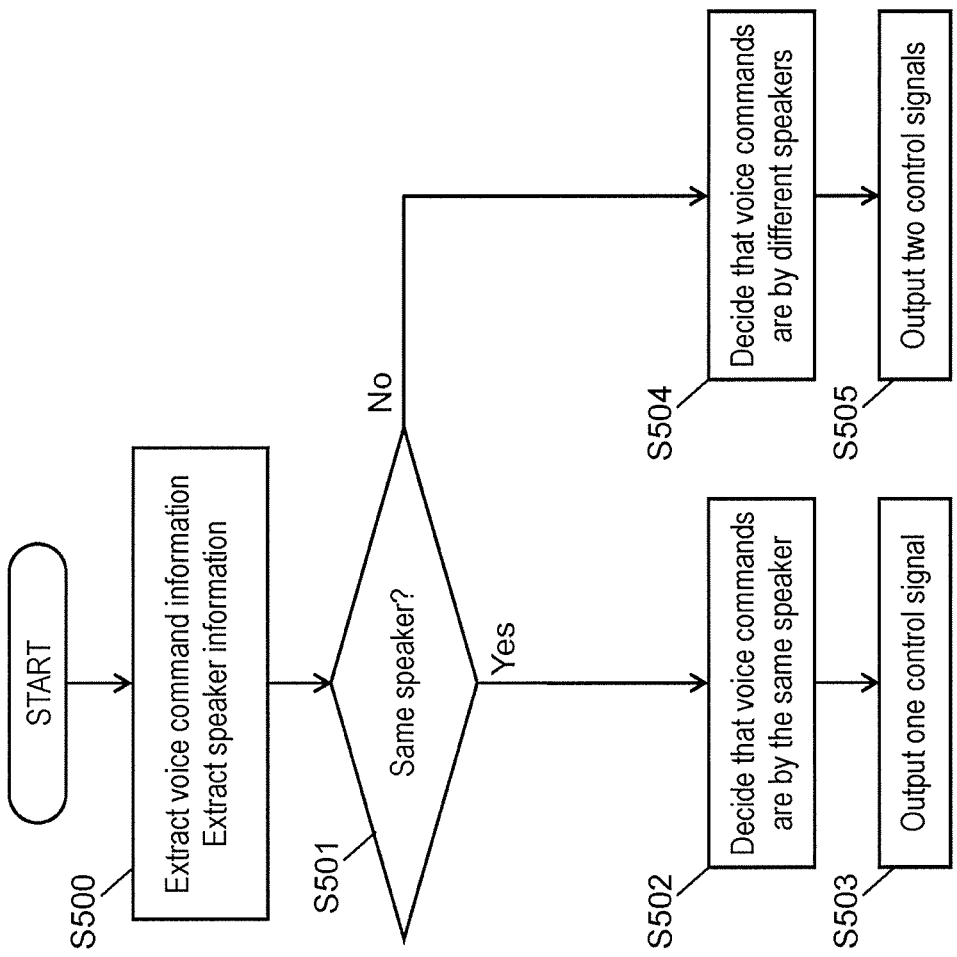
FIG. 5 is a flow chart showing an example of operation of the voice command input device according to the third exemplary embodiment.
Figure 6:
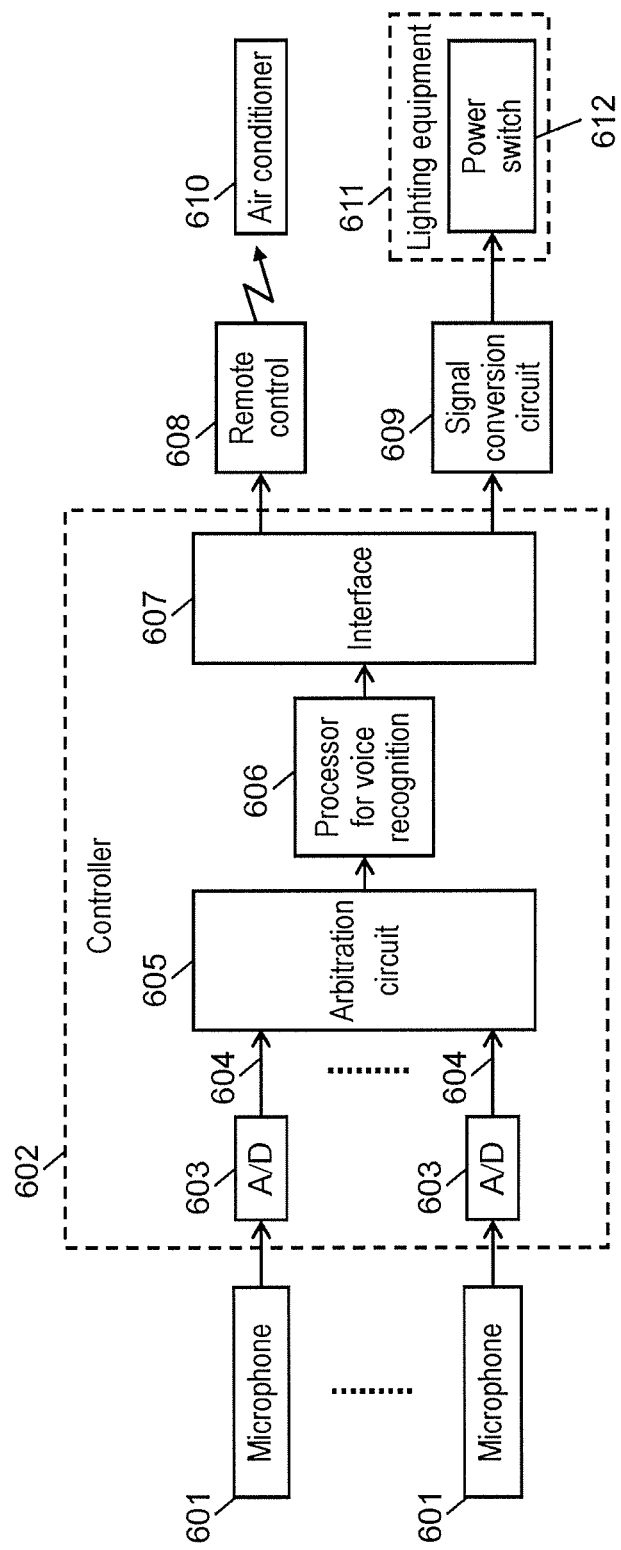
FIG. 6 is a block diagram showing a configuration of a conventional voice command input device.

FIG. 5 is a flow chart showing an example of operation of voice command input device 400 according to the third exemplary embodiment.

In the present exemplary embodiment, an example operation is described for a case where two pieces of voice information (in this example, first voice information 411, and second voice information 412) are approximately simultaneously input to voice command identifier 407, or where the pieces of information are input within a period of time where the pieces of information overlap each other. It is assumed that, when only one piece of voice information is input, voice command identifier 407 generates a control signal according to the voice command information included in the voice information and outputs the control signal. Description of the above operation is omitted. Voice command input device 400 may include three or more voice input units, and three or more pieces of voice information may be input to voice command identifier 407.

Voice command identifier 407 extracts voice command information (for example, the first voice command information and the second voice command information) and speaker information (for example, the first speaker information and the second speaker information) from each of a plurality of pieces of voice information (for example, first voice information 411 and second voice information 412) (step S500).

Next, voice command identifier 407 compares the pieces of speaker information extracted in step S500 with each other, and decides whether the pieces of information indicate the same speaker (step S501).

When it is decided in step S501 that respective pieces of speaker information indicate the same speaker (Yes), voice command identifier 407 determines that respective pieces of voice command information extracted in step S500 are the same information based on a voice uttered by one speaker (step S502).

Accordingly, voice command identifier 407 generates one control signal corresponding to respective voice command information, and outputs the signal to command issuer 408 (step S503).

When it is decided in step S501 that respective pieces of speaker information indicate different speakers (No), voice command identifier 407 determines that respective pieces of voice command information extracted in step S500 are separate pieces of information based on voices uttered by different speakers (step S504).

Accordingly, voice command identifier 407 generates control signals (for example, two control signals) corresponding to respective pieces of voice command information extracted in step S500, and outputs the signals to command issuer 408 (step S505).

(3-3. Effect, etc.)

As described above, in the present exemplary embodiment, the voice command input device includes a first voice input unit, a second voice input unit, and a voice command identifier. The first voice input unit includes a first identification information generator for outputting first identification information, and a first voice recognizer for converting a voice into first voice command information, the first voice input unit being configured to output first voice information including the first identification information and the first voice command information. The second voice input unit includes a second identification information generator for outputting second identification information, and a second voice recognizer for converting a voice into second voice command information, the second voice input unit being configured to output second voice information including the second identification information and the second voice command information. The voice command identifier is configured to generate and output a control signal for controlling an operation target appliance, based on the first voice information and the second voice information. The voice command identifier generates the control signal by referring to the first identification information and the second identification information.

In the present exemplary embodiment, the first identification information generator outputs, as the first identification information, first speaker information indicating an utterer of a voice which is input to the first voice input unit, and the second identification information generator outputs, as the second identification information, second speaker information indicating an utterer of a voice which is input to the second voice input unit. The voice command identifier generates the control signal based on a comparison of the first speaker information and the second speaker information.

First voice input unit 418 is an example of the first voice input unit, first voice recognizer 403 is an example of the first voice recognizer, first individual identifier 402 is an example of the first identification information generator, second voice input unit 419 is an example of the second voice input unit, second voice recognizer 406 is an example of the second voice recognizer, second individual identifier 405 is an example of the second identification information generator, voice command identifier 407 is an example of the voice command identifier, first voice information 411 is an example of the first voice information, and second voice information 412 is an example of the second voice information.

Thus, according to voice command input device 400, each of a plurality of voice input units can simultaneously accept voice commands uttered by different users. Accordingly, even when a plurality of users simultaneously utter voice commands to respective microphones, voice command input device 400 can perform voice recognition of each of these voice commands, and can perform a plurality of processes based on the results of voice recognition.

Voice command input device 400 can distinguish, based on the speaker information, whether voice commands picked up by respective microphones have been uttered by one speaker or by a plurality of speakers, and can generate control signal(s) based on a result of the distinction. Accordingly, even if one voice command uttered by one speaker is redundantly picked up by a plurality of microphones installed in a relatively small region for example, an erroneous operation of redundantly performing processes, for example, can be reduced, and a process based on the voice command can be appropriately performed.

Other Exemplary Embodiments

The first to the third exemplary embodiments have been described above as examples of the technique disclosed in the present disclosure. However, the technique according to the present disclosure can be applied to exemplary embodiments with modifications, substitutions, additions, omissions and the like without being limited to the exemplary embodiments described above. A new exemplary embodiment can be achieved by combining the structural elements described in the first to the third exemplary embodiments.

Accordingly, other exemplary embodiments will be illustrated below.

In the first exemplary embodiment, a configuration where the timestamp adder is provided to each voice recognizer is described. However, the present disclosure is not limited to such a configuration. For example, a time information source such as a timer or the like is provided inside the voice command identifier. When the voice command information is input to the voice command identifier, the voice command identifier refers to the time information source and generates timestamp information. Then, the timestamp information is linked with the voice command information. The voice command input device may be configured in this manner.

In the second exemplary embodiment, a configuration where the voice command identifier decides whether "pieces of position information are the same with each other" by comparing the pieces of position information with each other is described. However, the present disclosure is not limited to such a configuration. For example, the voice command identifier may be configured to calculate, from two pieces of position information, a separation distance between the pieces of information, and may execute to decide whether "the pieces of position information are the same with each other" based on a comparison of the calculated distance and a threshold. According to this configuration, if the separation distance calculated from the two pieces of position information is at or below a threshold (for example, 20 m), the two pieces of position information may be decided to be the same with each other, and if the separation distance is greater than the threshold, the two pieces of position information may be decided to be different from each other. Longitude information and latitude information, altitude information and the like may also be used as the position information.

In the third exemplary embodiment, a configuration where the first speaker information and the second speaker information are used as information for specifying a speaker (for example, an individual ID or an individual name) is described. However, the present disclosure is not limited to such a configuration. For example, the voiceprint information extracted from a voice command or information about feature points of a voiceprint may be taken as the speaker information, and the voice command identifier may also be configure to compare pieces of voiceprint information with each other, or to compare the feature points of voiceprints with each other. Also according to such a configuration, the voice command input device is enabled to decide whether utterers of a plurality of pieces of voice command information are the same speaker or different speakers. Voiceprint information does not have to be registered in advance in the voice command input device configured in this manner. Furthermore, since the voiceprint information does not have to be registered in advance, this voice command input device can be effectively used at locations where there are many unspecified users such as public areas, or the like.

Each structural element described in the present exemplary embodiments may be configured as an electronic circuit, or each structural element may be implemented by a processor executing a program.

INDUSTRIAL APPLICABILITY

The present disclosure can be applied to a voice command input device which allows a plurality of users to operate an appliance by voice. Specifically, the present disclosure may be applied to a system or a device that is configured in such a way that a plurality of microphones are installed at different locations, voices picked up by respective microphones are input to one control device, and an operation target appliance is controlled by the control device based on the voices.

REFERENCE MARKS IN THE DRAWINGS 100, 300, 400 voice command input device
101, 301, 401 first microphone
102, 302, 403 first voice recognizer
103 first timestamp adder
104, 304, 404 second microphone
105, 305, 406 second voice recognizer
106 second timestamp adder
107, 310, 407 voice command identifier
108, 311, 408 command issuer
109, 312, 411 first voice information
110, 313, 412 second voice information
111, 112, 315, 316, 317, 409, 410 voice command
113, 330, 413 appliance control signal
114, 318, 418 first voice input unit
115, 319, 419 second voice input unit
303 first position information adder
306 second position information adder
307 third microphone
308 third voice recognizer
309 third position information adder
314 third voice information
320 third voice input unit
402 first individual identifier
405 second individual identifier
414 first speaker information
415 second speaker information

The invention claimed is:
1. A voice command input device comprising:
a first voice input unit including a first identification information generator for outputting first identification information, and a first voice recognizer for converting a voice into first voice command information, the first voice input unit being configured to output first voice information including the first identification information and the first voice command information;
a second voice input unit including a second identification information generator for outputting second identification information, and a second voice recognizer for converting a voice into second voice command information, the second voice input unit being configured to output second voice information including the second identification information and the second voice command information; and
a voice command identifier configured to generate and output a control signal for controlling an operation target appliance, based on the first voice information and the second voice information, wherein the voice command identifier generates the control signal by referring to the first identification information and the second identification information, wherein the first identification information generator outputs, as the first identification information, first speaker information indicating an utterer of a voice which is input to the first voice input unit, wherein the second identification information generator outputs, as the second identification information, second speaker information indicating an utterer of a voice which is input to the second voice input unit, and wherein the voice command identifier:
  compares the first speaker information and the second speaker information;
  in case where the voice command identifier decides that the utterer whose voice is input to the first voice input unit and the utterer whose voice is input to the second voice input unit are the same utterer, generates one control signal corresponding to the same utterer; and
  in case where the voice command identifier decides that the utterer whose voice is input to the first voice input unit and the utterer whose voice is input to the second voice input unit are different utterers, generates two control signals that include a control signal corresponding to one of the different utterers and a control signal corresponding to the other of the different utterers.

2. A voice command input device comprising:
a first voice input unit including a first identification information generator for outputting first identification information, and a first voice recognizer for converting a voice into first voice command information, the first voice input unit being configured to output first voice information including the first identification information and the first voice command information;

a second voice input unit including a second identification information generator for outputting second identification information, and a second voice recognizer for converting a voice into second voice command information, the second voice input unit being configured to output second voice information including the second identification information and the second voice command information; and a voice command identifier configured to generate and output a control signal for controlling an operation target appliance, based on the first voice information and the second voice information, wherein the voice command identifier generates the control signal by referring to the first identification information and the second identification information, wherein the first identification information generator outputs, as the first identification information, first speaker information indicating a feature of a voice which is input to the first voice input unit, wherein the second identification information generator outputs, as the second identification information, second speaker information indicating a feature of a voice which is input to the second voice input unit, and wherein the voice command identifier:
  compares the first speaker information and the second speaker information;
  in case where the voice command identifier decides that an utterer whose voice is input to the first voice input unit and an utterer whose voice is input to the second voice input unit are the same utterer, generates one control signal corresponding to the same utterer; and
  in case where the voice command identifier decides that the utterer whose voice is input to the first voice input unit and the utterer whose voice is input to the second voice input unit are different utterers, generates two control signals that include a control signal corresponding to one of the different utterers and a control signal corresponding to the other of the different utterers.

3. A voice command input device comprising:
a first voice input unit including a first identification information generator for outputting first identification information, and a first voice recognizer for converting a voice into first voice command information, the first voice input unit being configured to output first voice information including the first identification information and the first voice command information;

a second voice input unit including a second identification information generator for outputting second identification information, and a second voice recognizer for converting a voice into second voice command information, the second voice input unit being configured to output second voice information including the second identification information and the second voice command information; and a voice command identifier configured to generate and output a control signal for controlling an operation target appliance, based on the first voice information and the second voice information, wherein the voice command identifier generates the control signal by referring to the first identification information and the second identification information, wherein the first identification information generator outputs, as the first identification information, first position information indicating a location where the first voice input unit is installed, wherein the second identification information generator outputs, as the second identification information, second position information indicating a location where the second voice input unit is installed, and wherein the voice command identifier:
  compares the first position information and the second position information;
  in case where the voice command identifier decides that the location where the first voice input unit is installed and the location where the second voice input unit is installed are the same location, generates one control signal corresponding to the same location; and
  in case where the voice command identifier decides that the location where the first voice input unit is installed and the location where the second voice input unit is installed are different locations, generates two control signals that include a control signal corresponding to one of the different locations and a control signal corresponding to the other of the different locations.

4. A voice command input method comprising:
generating first identification information;
converting a voice into first voice command information;
generating second identification information;
converting a voice into second voice command information;
referring to the first identification information and the second identification information; and generating a control signal for controlling an operation target appliance, based on a result of the referring, and the first voice command information and the second voice command information, wherein, in generating the first identification information, a first speaker information is output as the first identification information, the first speaker information indicating an utterer whose voice is converted to the first voice command information, wherein, in generating the second identification information, a second speaker information is output as the second identification information, the second speaker information indicating an utterer whose voice is converted to the second voice command information, and wherein, in generating the control signal,
the first speaker information and the second speaker information are compared,
in case where it is decided that the utterer whose voice is converted to the first voice command information and the utterer whose voice is converted to the second voice command information are the same utterer, one control signal corresponding to the same utterer is generated, and
in case where it is decided that the utterer whose voice is converted to the first voice command information and the utterer whose voice is converted to the second voice command information are different utterers, two control signals that include a control signal corresponding to one of the different utterers and a control signal corresponding to the other of the different utterers are generated.

5. A voice command input method comprising:
generating first identification information;
converting a voice into first voice command information;
generating second identification information;
converting a voice into second voice command information;
referring to the first identification information and the second identification information; and
generating a control signal for controlling an operation target appliance, based on a result of the referring, and the first voice command information and the second voice command information, wherein, in generating the first identification information, a first speaker information is output as the first identification information, the first speaker information indicating a feature of a voice to be converted to the first voice command information, wherein, in generating the second identification information, a second speaker information is output as the second identification information, the second speaker information indicating a feature of a voice to be converted to the second voice command, and wherein, in generating the control signal,
the first speaker information and the second speaker information are compared,
in case where it is decided that an utterer whose voice is converted to the first voice command information and an utterer whose voice is converted to the second voice command information are the same utterer, one control signal corresponding to the same utterer is generated, and
in case where it is decided that the utterer whose voice is converted to the first voice command information and the utterer whose voice is converted to the second voice command information are different utterers, two control signals that include a control signal corresponding to one of the different utterers and a control signal corresponding to the other of the different utterers are generated.

6. A voice command input method comprising:
generating first identification information;
converting a voice into first voice command information;
generating second identification information;
converting a voice into second voice command information;
referring to the first identification information and the second identification information; and
generating a control signal for controlling an operation target appliance, based on a result of the referring, and the first voice command information and the second voice command information, wherein, in generating the first identification information, a first position information is output as the first identification information, the first position information indicating a location where a first voice input unit to which the voice to be converted to the first voice command information is input is installed, wherein, in generating the second identification information, a second position information is output as the second identification information, the second position information indicating a location where a second voice input unit to which the voice to be converted to the second voice command information is input is installed, and wherein, in generating the control signal,
the first position information and the second position information are compared,
in case where it is decided that the location where the first voice input unit is installed and the location where the second voice input unit is installed are the same location, one control signal corresponding to the same location is generated, and
in case where it is decided that the location where the first voice input unit is installed and the location where the second voice input unit is installed are different locations, two control signals that include a control signal corresponding to one of the different locations and a control signal corresponding to the other of the different locations are generated.

* * * * *